United States Patent
Gaiser et al.

(10) Patent No.: US 6,205,403 B1
(45) Date of Patent: Mar. 20, 2001

(54) METHOD FOR DETERMINING HORIZONTAL GEOPHONE ORIENTATION IN OCEAN BOTTOM CABLES

(75) Inventors: James Eric Gaiser, Littleton, CO (US); Frederick J. Barr, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/303,312

(22) Filed: Apr. 30, 1999

(51) Int. Cl.⁷ ........................................... G01V 1/00
(52) U.S. Cl. .................................................. 702/14
(58) Field of Search ............................... 702/14, 17, 18; 367/16, 19, 15, 72; 181/110–112

(56) References Cited

U.S. PATENT DOCUMENTS

| | | | |
|---|---|---|---|
| 5,610,875 | * 3/1997 | Gaiser | 702/14 |
| 5,747,750 | 5/1998 | Bailey et al. | |
| 5,917,160 | * 6/1999 | Bailey | 181/112 |
| 6,021,090 | * 2/2000 | Gaiser et al. | 367/15 |
| 6,061,298 | * 5/2000 | Madtson et al. | 367/72 |

OTHER PUBLICATIONS

"Attenuation of Water–Column Reverberations Using Pressure and Velocity Detectors in a Water–Bottom Cable", 59th Ann. Internat. Mtg., Soc. Expl. Geophys., Dallas, Texas (1989).

"Ocean Bottom Receiver Locations", 25th Ann. OTC, Houston, Texas, May 3–6, 1993.

"Vertical Seismic Profiling", Geophysical Press, 1984, pp. 177–188.

\* cited by examiner

Primary Examiner—Donald E. McElheny, Jr.
(74) Attorney, Agent, or Firm—Baker Botts L.L.P.

(57) ABSTRACT

Method is provided for determining the orientation or horizontal geophones used in marine seismic surveying. First-arrival signals are processed by rotating a coordinate system mathematically until the signal from the transverse receiver has minimum energy. The amount of rotation is used to calculate, from the known azimuth from the source, any misalignment of the horizontal geophone as the receiver is placed on the ocean bottom.

2 Claims, 6 Drawing Sheets

METHOD FOR DETERMINING HORIZONTAL GEOPHONE ORIENTATION IN OCEAN BOTTOM CABLES

BACKGROUND OF THE INVENTION

1. Field of the Invention

This invention pertains to marine seismic surveying. More particularly, method is provided for determining orientation of horizontal receivers used for detecting shear waves in ocean-bottom cable surveys.

2. Description of the Related Art

Marine seismic surveys are often obtained using hydrophones connected to electrical cables that are contained in streamers towed behind boats. Hydrophones measure pressure waves (P-waves) that are reflected and refracted through the water and earth layers. There is no need to know the orientation of hydrophones. Seismic data acquisition in shallow water was carried out many years ago using geophones connected to stationary cables that were placed on the bottom by hand. Soon there was a need to extend operations to deeper water and ocean-bottom cable (OBC) came into use, which required the use of small boats for cable layout. As long as hydrophones and single component vertical geophones were used there was a method to insure orientation of the geophones in the desired vertical direction. In recent years, there has been renewed interest in using stationary receiver spreads on the seafloor in deeper water with three-component (3C) geophones. Often a hydrophone is also used in proximity to a 3C geophone to produce a four-component (4C) receiver. This interest in 4C OBC systems has been the result of several factors, including the development of techniques for suppressing water-column reverberation noise ("Attenuation of Water-Column Reverberations Using Pressure and Velocity Detectors in a Water-Bottom Cable," 59th Ann. Internat. Mtg., Soc. Expl. Geophys., Dallas (1989), and the demonstration that mode-converted shear waves can be used to great advantage to obtain additional information about the subsurface. Multi-component data that describe the total vector wavefield of P-wave and S-wave particle motion are necessary to maximize the information that can be gleaned from a seismic survey.

Location of ocean-bottom receivers must be known for data acquisition. This can be provided by, for example, the method described by Edington, et al ("Ocean Bottom Receiver Location," 25th Ann. OTC, Houston, May 3–6, 1993). But, for three-component geophones, orientation must also be known. The geophones are normally constructed with the vertical geophone gimballed to remain vertical regardless of orientation of the geophone case. The important orientation problem remaining for OBC systems is then measuring the orientation or azimuth of the horizontal receivers. These receivers record particle motion of the S-waves, and the particle motion can range over all azimuths, particularly for a 3-D survey where a single receiver station will be surrounded by sources. When the horizontal orientation is not known, S-wave data detected by the horizontal receivers cannot be combined properly for vector wavefield processing.

The orientation of three-component geophones in an ocean-bottom cable survey can differ from one station to the next. This is because as the cable attached to the geophones and hydrophones is released from the boat, it does not always reach the sea floor in a straight configuration. The cable and receivers may reach the seafloor with curves in the cable. Curvature in the cable and, in some cases, uneven bottom surfaces, can cause horizontal receivers to be out of alignment with their intended direction. Lack of alignment may occur for all acquisition methodologies to some degree, whether cables are dragged or draped or for units planted on the sea floor by remotely operated vehicles.

In the art of recording vertical seismic profiles around wells, there is also a need for orientation of the horizontal components at each depth in a borehole. A solution of DiSiena et al. (*Vertical Seismic Profiling*, Geophysical Press, 1984, pages 177–188) analyzed the amplitude distribution of the direct downgoing P-wave arrival detected by the x and y horizontal receivers. A histogram was constructed of the magnitude versus the instantaneous orientation for all the time samples in a window including the direct arrival. The bin with the maximum peak in the histogram was interpreted as the horizontal direction aligned with the P-wave particle motion and thus the source-receiver direction. Since the histogram analysis referenced an angle between 0° and 180°, the vertical component was used to remove horizontal polarity ambiguities.

What is needed is a method for determining the orientations of the horizontal receivers during conventional OBC surveys without the need for additional equipment. This method should provide the accuracy in orientation that provides for combining the various horizontal receivers properly for vector wave field processing of the seismic data collected.

SUMMARY OF THE INVENTION

A method for determining the orientations of the horizontal components of geophones in an OBC survey is provided by analyzing the direct water wave and near offset refracted wave first arrivals. In one embodiment, the method consists of making a least squares fit to the crossline energy as a function of azimuth. This determines the orientation of the in-line component with a possible ambiguity of 180°. If this ambiguity is not easily removed, in a second embodiment, a two-step process is used where first the orientation of the in-line component is determined with an ambiguity of 180° then, by using the hydrophone data as a reference, the 180° ambiguity is resolved by cross-correlation with the in-line component. The final orientation of the in-line component is the direction of negative cross-correlation.

The azimuth of a source with respect to a receiver is known as a source, such as an air gun, moves with respect to the stationary receivers. For each shot, the rotation angle that minimizes the transverse component is determined and is interpreted as the angle to point the in-line receiver either towards or away from the source. Repeating this procedure for many source recordings provides a statistical estimate of the orientation of each receiver.

DESCRIPTION OF PREFERRED EMBODIMENTS

Figure 1:
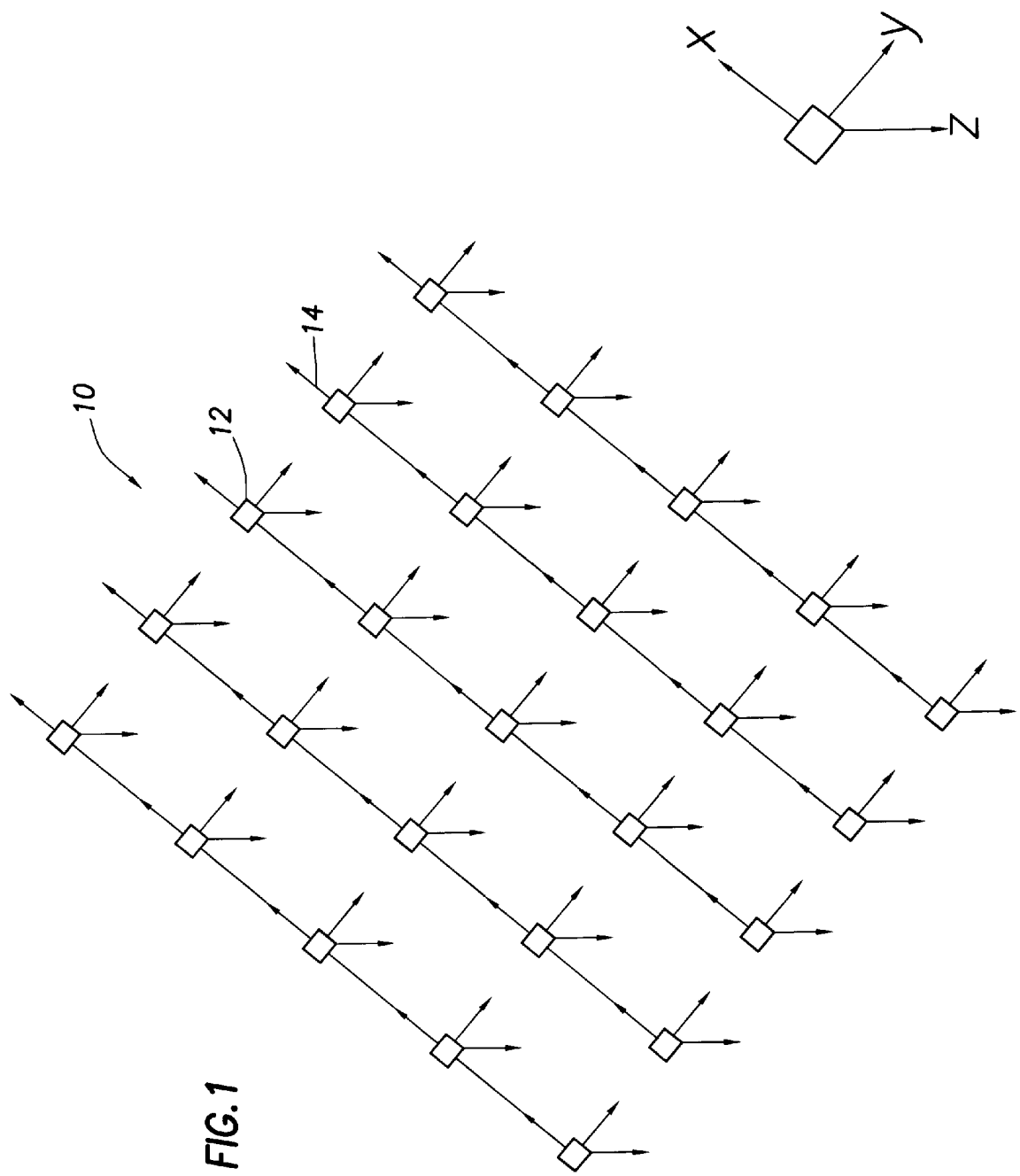
FIG. 1 depicts a spread of five lines of geophones with horizontal receivers perfectly aligned along straight cables.

Referring to FIG. 1, five-cable acquisition system 10 is shown with receiver packages 12, including horizontal receivers, with one of the horizontal receivers perfectly aligned in the direction of cable 14, the second horizontal receiver orthogonal to the aligned receiver and all vertical receivers aligned vertically. Multicomponent data are generally acquired with a rectangular polarization coordinate system for either 2-D or 3-D surveys. That is, at any one receiver location there are three-component seismic traces defined as $S_x(\tau)$, $S_y(\tau)$ and $S_z(\tau)$, where $\tau$ is the recording time. These are typically called the in-line, cross-line and vertical components of displacement for the corresponding directions, respectively, where the in-line is parallel to some reference frame such as a receiver or cable line such as the receiver lines shown in FIG. 1. For instances of multicomponent sources, a shot line may be used as the in-line direction.

The coordinate system such as shown in FIG. 1 is generally a right-handed system. The in-line component points in the positive receiver line direction, the cross-line points at 90 degrees to the right, and the vertical points downward. It is right-handed in the sense that the y component is clockwise from the x component when looking in the positive z direction.

Seismic data acquisition using such a system normally involves use of an airgun array (not shown) towed by separate boat as an energy source. Cables 14 are stationery during data acquisition. A recording boat anchored with cables attached or a buoy or other means (not shown) of obtaining data from the cables is employed. Patch, swath or radial designs are commonly used in the 3-D surveys. Typically, four components are recorded from receiver package 12, which contains a hydrophone and a three-component geophone. Two horizontal receivers, in-line and cross-line, provide shear wave data (PS-wave data) from mode-converted pressure waves.

Figure 2:
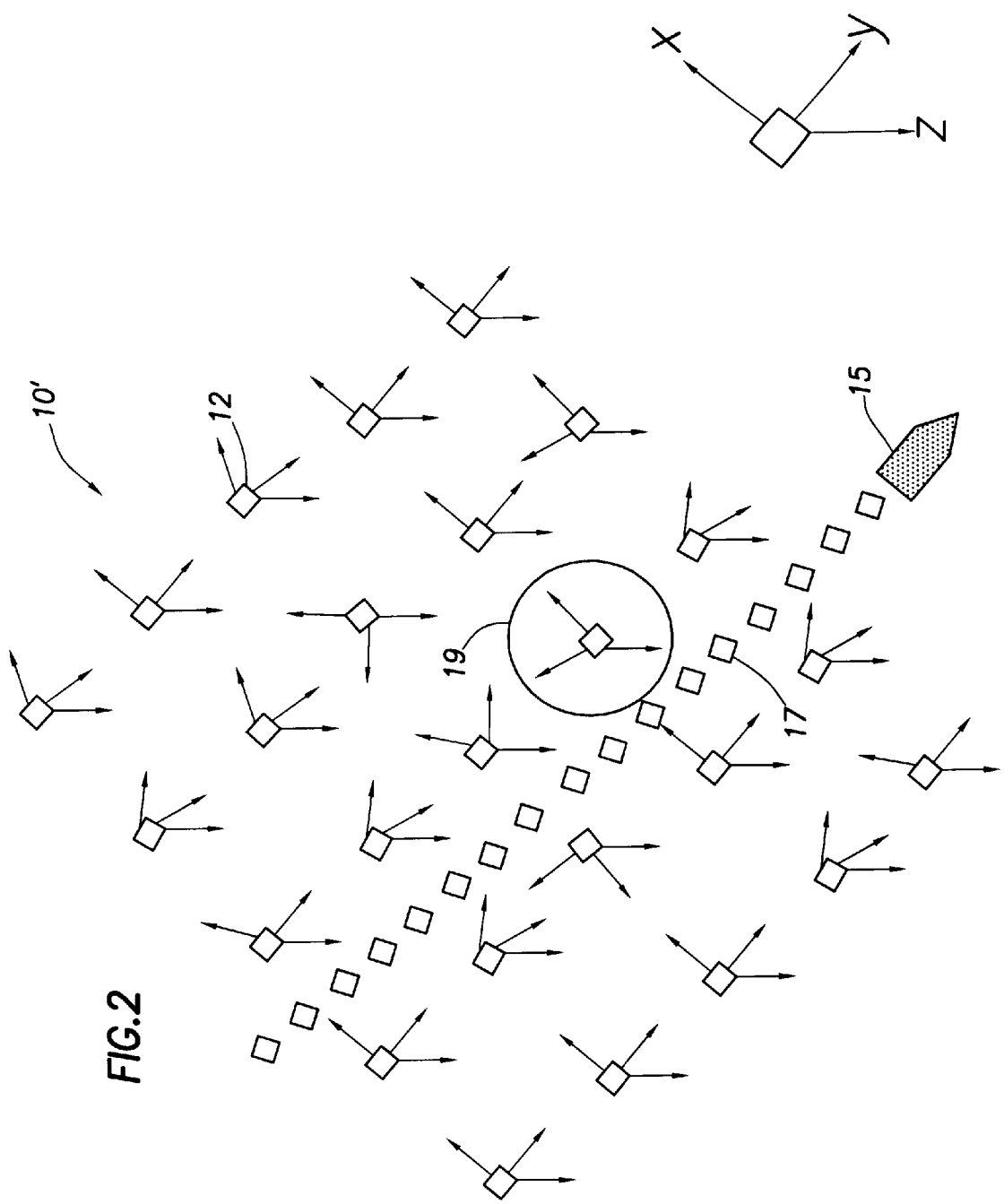
FIG. 2 depicts geophones laid out in five lines with horizontal receivers not aligned in the intended direction.

FIG. 2 shows an exaggerated situation for orientation of horizontal receivers 12 in five-cable acquisition system 10' after water currents and dynamics of the cable as it falls through the water have caused receiver packages 12, including horizontal receivers, to be misaligned with respect to their intended direction along the cable, or the in-line direction. For simplicity, the cables are not shown in FIG. 2, but their configuration would be compatible with the indicated directions of the x and y horizontal receivers. The coordinate system is unchanged. Boat 15 may tow a source such as an airgun array that has produced sources at a plurality of locations 17 as the boat is moved across patch 10'.

Figure 3C:
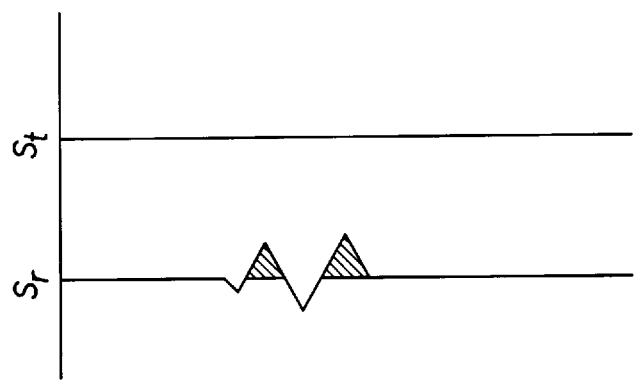
FIG. 3 shows: (a) a linearly polarized direct arrival in the x and y directions, (b) a hodogram crossplot of the data, and (c) the data after rotation into a radial-transverse coordinate system.
Figure 3B:
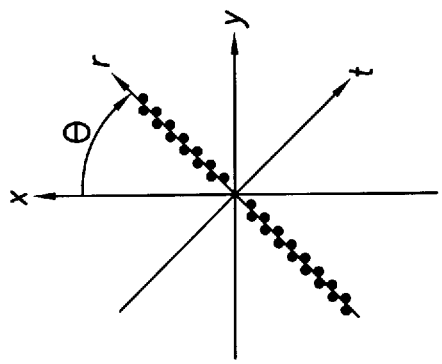
Figure 3A:
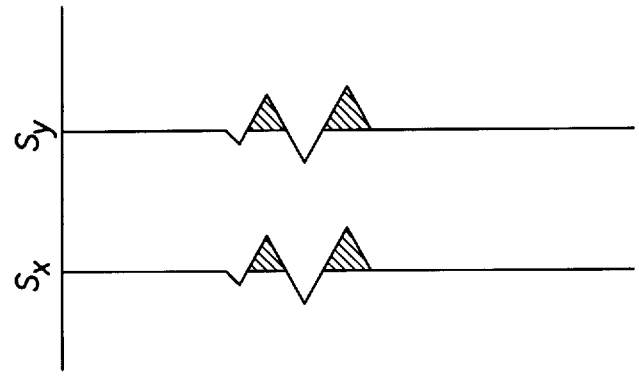

FIG. 3 illustrates a direct arrival recorded on the two horizontal geophones from a source at locations such as 17 (shown in FIG. 2). The recorded seismograms $S_x$ and $S_y$ represent the signal from source 17 at, for example, the geophone highlighted at 19. When samples of the two components are plotted in a hodogram, such as shown in FIG. 3(b), if the received wave is linearly polarized the response traces out a line. The line will make an angle $\theta$ with respect to the x axis, which is the in-line axis. If the source is, instead, elliptically polarized, the line will be replaced by an ellipse and the angle of the major axis of the ellipse will be a line at angle $\theta$. To determine the orientation of the horizontal components, first-break polarization analyses rely on direct P-wave arrivals, as well as P-wave refractions, P-wave and PS-wave reflections that are linearly polarized seismic events. It is assumed that the source-receiver is in-line with the linearly polarized first-break energy.

The x and y components can be rotated mathematically in a computer to simulate preferred directions of polarization, as if the data had been acquired with some other receiver orientation. A simple two-component rotation is performed by the matrix equation:

$$\begin{pmatrix} S'_x \\ S'_y \end{pmatrix} = \begin{pmatrix} \cos(\theta) & \sin(\theta) \\ -\sin(\theta) & \cos(\theta) \end{pmatrix} \begin{pmatrix} S_x \\ S_y \end{pmatrix}, \quad (1)$$

where $\theta$ is the rotation angle. The 2×2 rotation operator may be applied at each time sample of the $S_x$ and $S_y$ seismograms to yield new seismic traces $S'_x$ and $S'_y$ that represent the seismic wave field polarization for the new orientation in the new coordinate system. As an example, applying the desired orientation $\theta$ to the data in FIG. 3 will place all the energy on the $S'_x = S_r$ radial component and leave the $S'_y = S_t$ component devoid of energy, as shown in FIG. 3(c). The operator in Equation 1 is unitary and does not change the total magnitude of signals.

Figure 4:
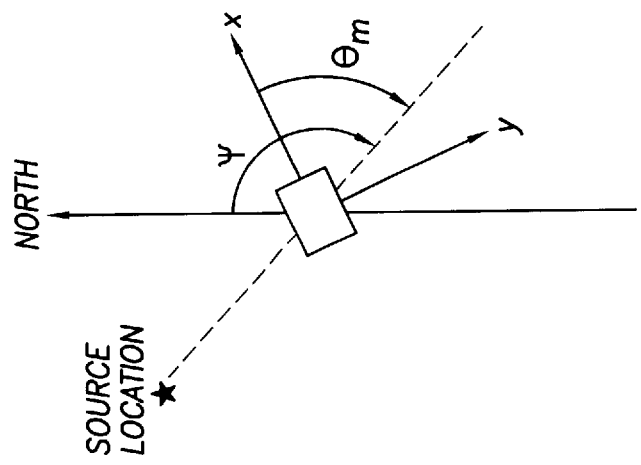
FIG. 4 shows angles in a coordinate system used to calculate azimuth.

Given the two components, $S_x$ and $S_y$, $\theta$ is estimated from the direct arrival energy when the orientation is unknown. This will provide the orientation of the horizontal geophones as they came to rest on the sea floor. Determining $\theta$ is preferably done by a least-squares method to find the optimal orientation that minimizes the energy of the $S_y'$ transverse component. For a single shot, the approach fits a sine/cosine curve to the total energy of the direct arrival, $E'_y(\theta)$. Total energy is the sum of the $S_y'$ amplitudes squared over the window of the first-break arrival. This leads to the least-squares problem, $$\sum_i [E'_y(\theta_i) - (a + b\sin(\theta_i) + c\cos(\theta_i))]^2 = \min, \quad (2)$$

where the summation index, i, is over several test orientations of $\theta$ (at least 3). The coefficients a, b, and c can be determined and provide the direction where Equation 2 is a minimum. The direction of the in-line receiver is $\psi - \theta_m$, where $\theta_m$ is the angle where the transverse energy is minimum and $\psi$ is the source-receiver azimuth in the coordinate system, as shown in FIG. 4. An attractive feature of this method is that it can be performed on numerous shots, for the same receiver, to provide a statistical measure of the orientation. Typically, shots that have source-receiver offsets greater than the receiver depth (100 to 200 meters) and less than 500 to 1000 meters are sufficient. In a 3-D survey, all shots in this offset range regardless of their direction or azimuth from the shot are selected for analysis. An equivalent method for determining $\theta_m$ is use of the least squares method that maximizes energy on the $S_x'$ radial component.

The orientation determined in this manner has an ambiguity and may actually point in the opposite direction, 180 degrees from the correct orientation. If it is not possible to resolve this ambiguity from limited knowledge of horizontal receiver direction, for example, from knowing that the direction of receivers must be within a limited angular range from cable direction, the uncertainty can be removed by cross-correlating the in-line component with the hydrophone signal for shots located in the determined receiver azimuth as well as for the opposite azimuth.

Figure 5C:
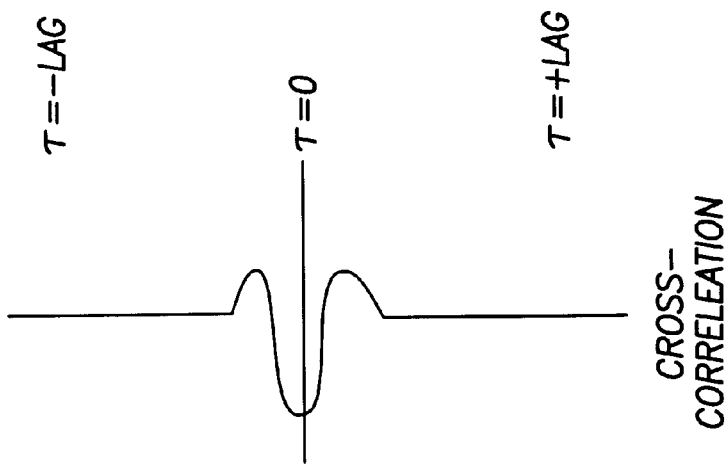
FIG. 5 shows (a) a horizontal geophone response, (b) a pressure response and (c) the cross-correlation of the responses in (a) and (b).
Figure 5B:
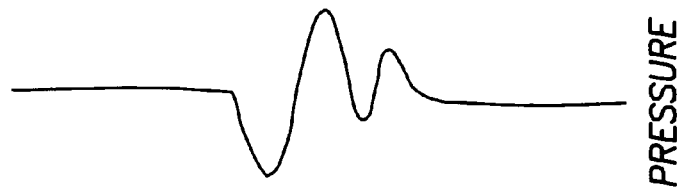
Figure 5A:
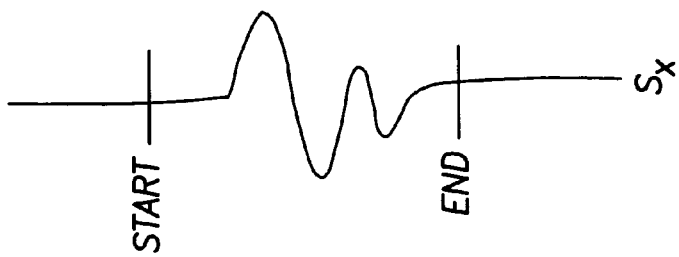

FIG. 5(a) shows an example of an in-line response and FIG. 5(b) shows a pressure response. The two signals may be cross-correlated using Equation 3.

$$C(\tau) = \sum_{t=START}^{END} S_x(t)P(t+\tau) \quad (3)$$

The resulting curve is shown in FIG. 5(c). The direction that yields negative cross correlations is identified as the correct orientation of the in-line component. This orients the three-component receiver system in accordance with SEG (Society of Exploration Geophysicists) standards, such that a reflection from a positive impedance contrast will produce a trough, or negative voltage output, for both a P-wave and a converted P-wave to an S-wave.

Figure 6:
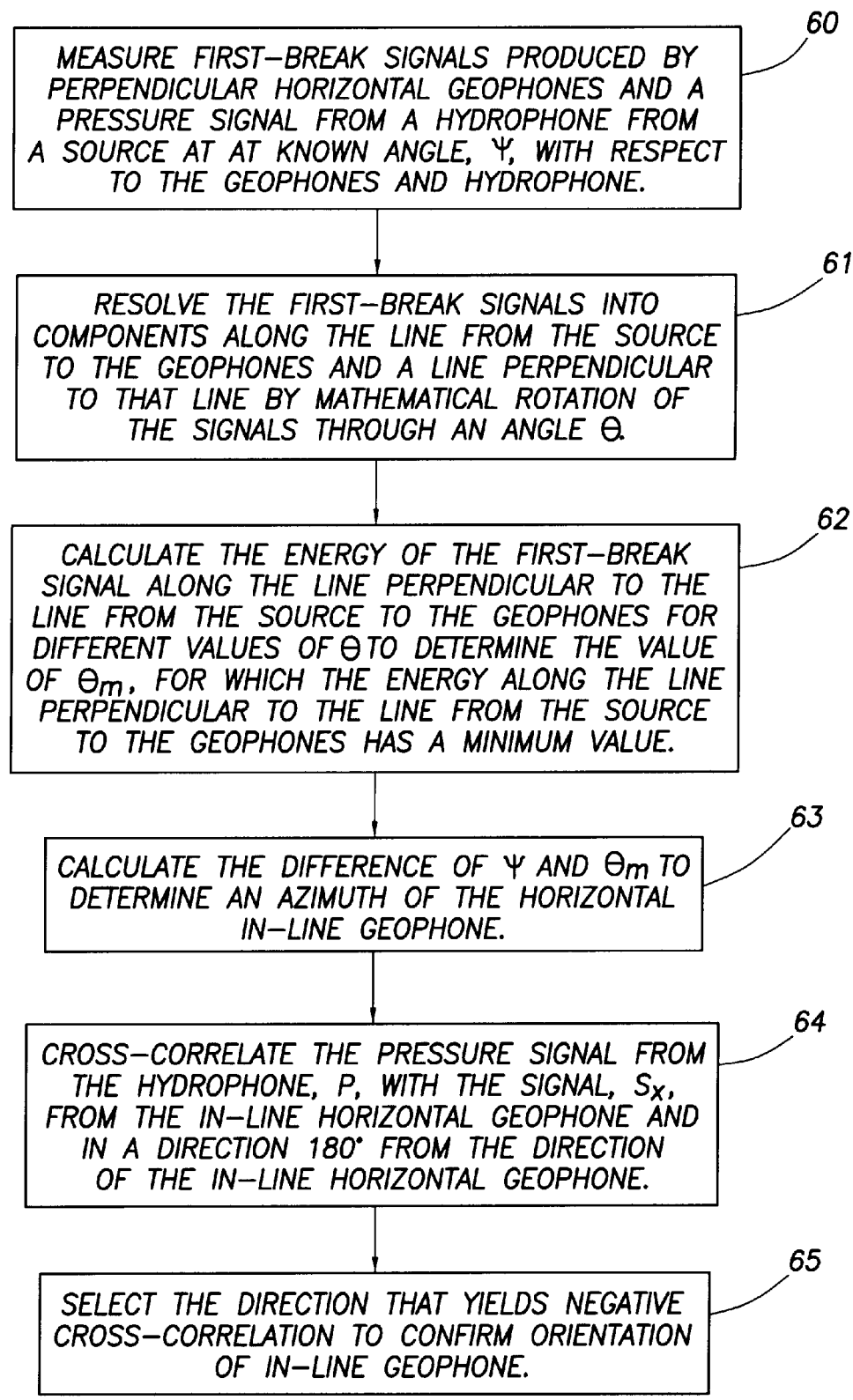
FIG. 6 shows a flow chart of a process for determining the azimuth angle of an in-line horizontal geophone on the ocean bottom.

FIG. 6 shows the steps used to determine the orientation of the in-line geophone. Referring to component 60, first-break signals produced by perpendicular horizontal geophones are measured and a pressure signal from a hydrophone is measured. The geophones and hydrophones are at a know angle, ψ, with respect to the geophones and the hydrophone. The first-break signals are then resolved into components along the line from the source to the geophones and a line perpendicular to that line using mathematical rotation, according to component 61. Component 62 shows that the energy of the first-break signal along the line perpendicular to the line from the source to the geophones for different values of θ is calculated to determine the value of θ for which the energy has a minimum value. Component 63 describes the step of calculating the difference of the angle of the source with respect to geophones and hydrophone and the angle of minimum energy. This determines the azimuth of the horizontal in-line geophone. Then, according to component 64, the pressure signal from the hydrophone is correlated with the signal from the in-line horizontal geophone at an angle 180° from the direction of the in-line horizontal geophone. Finally in component 65, the direction is selected that yields a negative cross-correlation, which confirms the orientation of the in-line geophone.

Figure 7:
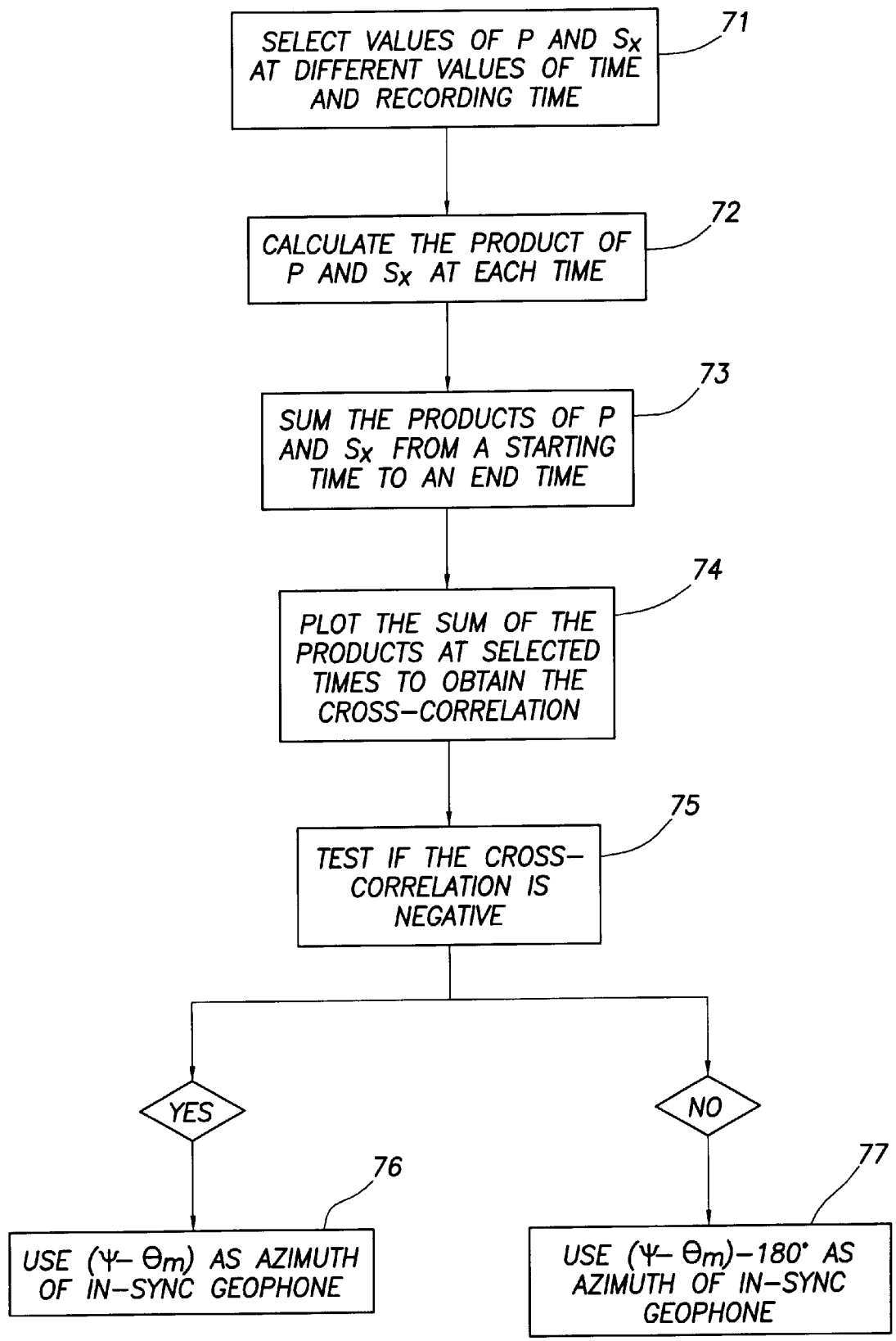
FIG. 7 shows a process for performing a cross-correlation of geophone and hydrophone signals to determine if an initial value of azimuth is correct or requires adjustment by 180 degrees.

FIG. 7 further explains which angle is used as the azimuth of the in-line geophone. Component 71 describes how values of P and $S_x$ are selected at different values of time and recording time. Component 72 describes the calculation of the product of P and $S_x$ at each time. Component 73 shows that the products are summed from starting time to an end time. Component 74 describes that the sum of the products at selected times may be plotted to obtain the cross-correlation. Component 75, 76 and 77 describe the test to determine if the cross-correlation is negative. If it is negative then the selected values of ψ and $θ_m$ are used as the azimuth of the in-line geophone. If it is negative then an angle 180° different is used as the azimuth of the in-line geophone.

Although the present invention has been described with reference to specific details, it is not intended that such details should be regarded as limitations upon the scope of the invention, except as and to the extent that they are included in the accompanying claims.

FIG. 7 provides the procedure that may be used to obtain the cross-correlation and confirm or adjust by 180 degrees the azimuth of the in-line geophone.

What we claim is:

1. A method for determining azimuth of an in-line horizontal geophone within a seismic receiver at a known location on an ocean bottom, comprising the steps of:

measuring during a selected time interval first-break signals produced by the in-line horizontal geophone and a second horizontal geophone perpendicular thereto, the signals being from a compressional wave originating at a source, the source being at a known azimuth ψ with respect to the receiver;

resolving the first-break signal into components along a line from the source to the receiver and a line perpendicular to the line from the source to the receiver by mathematical rotation of the signals through an angle θ;

calculating energy of the first-break signal along the line perpendicular to the line from the source to the receiver for different values of θ to determine $θ_m$, the value of θ for which the energy along the line perpendicular to the line from the source to the receiver has a minimum value;

calculating the difference of ψ and $θ_m$ to determine azimuth of the in-line geophone;

during the selected time interval measuring a pressure signal from a hydrophone, the hydrophone being in proximity to the in-line horizontal geophone;

cross-correlating the pressure signal from the hydrophone with the signal from the in-line horizontal geophone in the direction of $θ_m$ and in a direction 180 degrees therefrom; and selecting the direction that yields negative cross-correlation to confirm the orientation of the in-line horizontal geophone.

2. The method of claim 1 wherein the cross-correlation is performed using the equation:

$$C(\tau) = \sum_{t=START}^{END} S_x(t)P(t+\tau)$$

where $S_x(t)$ is the in-line component of displacement as a function of time, P(t+τ) is the pressure response as a function of recording time plus delay time, C(τ) is the cross-correlation as a function of delay time, τ is cross-correlation delay time and t is recording time.

* * * * *